(No Model.)
C. HOWBRIDGE.
AUGER HANDLE.
No. 435,751. Patented Sept. 2, 1890.
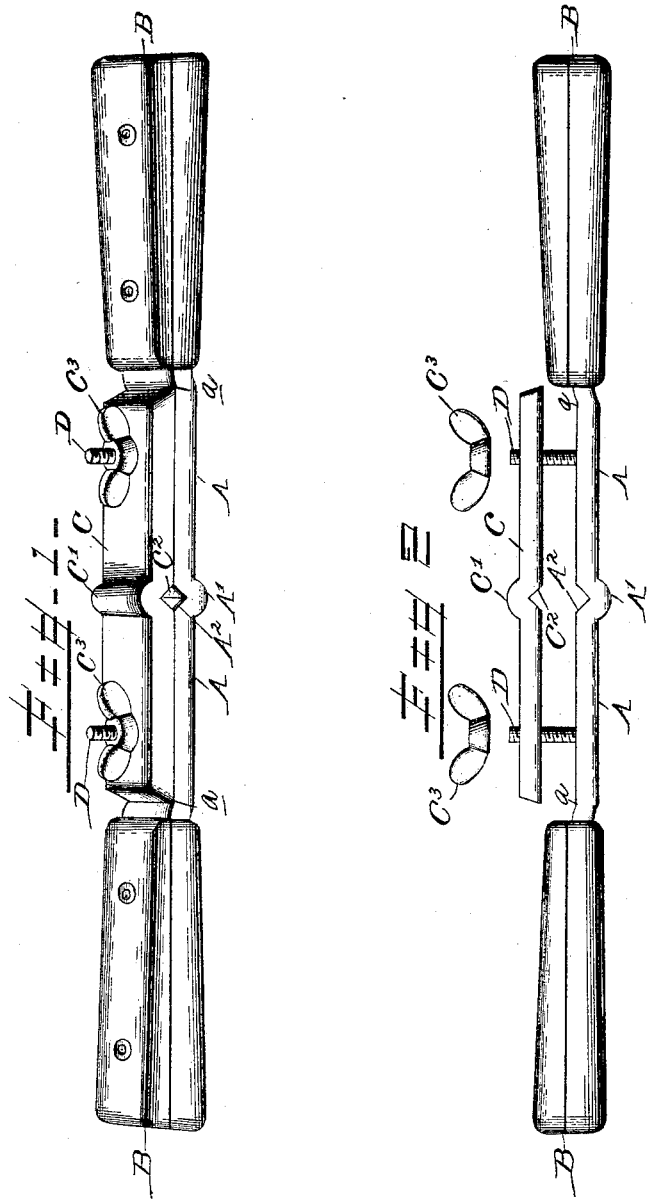

UNITED STATES PATENT OFFICE.

CHARLES HOWBRIDGE, OF FRIENDSHIP, NEW YORK.

AUGER-HANDLE.

SPECIFICATION forming part of Letters Patent No. 435,751, dated September 2, 1890.

Application filed March 4, 1890. Serial No. 342,605. (No model.)

*To all whom it may concern:*

Be it known that I, CHARLES HOWBRIDGE, a citizen of the United States, residing at Friendship, in the county of Allegany and State of New York, have invented certain new and useful Improvements in Auger-Handles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in auger-handles; and it has for its object to simplify and cheapen and at the same time render more efficient in operation, this class of appliances.

To the above ends and to such others as the invention may pertain the same consists in the peculiar construction and in the novel combination, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, like letters of reference indicating like parts throughout the several views, and in which—

Figure 1 is a perspective view of an auger-handle embodying my invention. Fig. 2 is a similar view, in which the parts are shown as separated, but in their relative positions.

Reference now being had to the details of the drawings by letter, A represents a bar of metal, to the ends of which are secured handles B B in any suitable manner. At the longitudinal center of the bar A an offset A' is formed, and upon the face of the bar opposite to said offset is provided a triangular recess $A^2$.

C is a bar of metal corresponding in width with the width of the bar A, and of such a length as to adapt it to be fitted between the handles B. This bar C is provided at its longitudinal center with an offset C', similar in all respects to the offset A' upon the bar A, and upon the opposite face of the bar a triangular recess $C^2$ is provided.

D D are bolts which are passed through the bars A and C. These bolts have their heads countersunk within suitable recesses formed within the outer face of the bar A, while their opposite ends, which extend for a short distance above or beyond the outer face of the bar C, are provided with set-screw nuts $C^3$.

The operation of the handle will be readily understood. By loosening the nuts $C^3$ the bars A and C may be separated and the shank of the auger may be inserted within the central opening between the bars, when by tightening the nuts the bars will be drawn closely together and the tool will be held firmly in place.

I am aware that it has been proposed to form a tool-handle with a longitudinal slot, and with a wooden socket, clamping-plates and screws being provided to draw the parts together to hold the shank of the tool, and I do not seek to cover such construction. I deem it important that the bars A C be separate and of metal, so that they may be readily replaced in case of breakage, and the securing means are removed from the shank-receiving opening, thus allowing the part C to yield under undue strain, and thus avoid injury. The bar A is formed with offset $a$ near its connection with the handles B, which serve to prevent endwise movement of the bar C, and also to bring the opening for the reception of the shank of the auger in line with a line drawn centrally longitudinally through the handles, thus materially strengthening the device.

Having thus described my invention, what I claim to be new, and desire to secure by Letters Patent, is—

1. The herein-described improvement in handles for augers, the same consisting of the metallic bar A, having handles secured to its ends, and formed near its connection with the handles with offsets $a$, and at its center provided with an offset and recess, as described, the metallic bar C, separate from the bar A and also provided with an offset and recess, and the bolts passed through the bars A and C between the offsets $a$ and the center recesses, and provided at their ends with set-screws, by means of which the bars may be drawn together and into contact with each other, substantially as described, and for the purpose specified.

2. The herein-described handle, consisting of the metallic bars A C, arranged in close contact with each other, the bar A having handles B B secured to its ends and formed near its connection with the handles with offsets $a$, and each of the bars formed at their centers with angular offsets A' C' and triangular recesses $A^2$ $C^2$, respectively, the bolts projecting from the bar A at a distance from the offset therein and projecting through holes in the bar C between the offsets $a$ and the triangular recesses, and the thumb-nuts on the ends of said bolts, substantially as shown and described.

In testimony whereof I affix my signature in presence of two witnesses.

CHARLES HOWBRIDGE.

Witnesses:
C. J. RICE,
F. H. RICE.